(12) United States Patent
DeLaurier

(10) Patent No.: US 9,050,244 B2
(45) Date of Patent: Jun. 9, 2015

(54) CONSUMABLE PACIFIER

(71) Applicant: Bobbie DeLaurier, St. Clair Shores, MI (US)

(72) Inventor: Bobbie DeLaurier, St. Clair Shores, MI (US)

( * ) Notice: Subject to any disclaimer, the term of this patent is extended or adjusted under 35 U.S.C. 154(b) by 0 days.

(21) Appl. No.: 13/842,598

(22) Filed: Mar. 15, 2013

(65) Prior Publication Data

US 2014/0277135 A1    Sep. 18, 2014

(51) Int. Cl.
*A61J 17/00* (2006.01)
*A23G 3/34* (2006.01)

(52) U.S. Cl.
CPC . *A61J 17/00* (2013.01); *A23G 3/34* (2013.01); *A61J 2017/008* (2013.01)

(58) Field of Classification Search
CPC ............... A61J 17/00; A61J 2017/001; A61J 2017/008; A61J 2017/006

USPC ......... 604/77, 385.07, 74–76; 215/11.1–11.6; 606/234–236; 426/72–74, 104
See application file for complete search history.

(56) References Cited

U.S. PATENT DOCUMENTS

| | | | | |
|---|---|---|---|---|
| 4,992,283 | A | * | 2/1991 | Shorey .......................... 426/132 |
| 5,300,024 | A | * | 4/1994 | Yang ............................... 604/73 |
| 5,354,274 | A | * | 10/1994 | Demeter et al. ................. 604/77 |
| 7,331,478 | B2 | * | 2/2008 | Aljadi ........................... 215/11.4 |
| 2011/0046671 | A1 | * | 2/2011 | Okoturo .......................... 29/428 |
| 2013/0338711 | A1 | * | 12/2013 | Strazzeri ....................... 606/235 |

* cited by examiner

*Primary Examiner* — Todd Manahan
*Assistant Examiner* — Erich Herbermann
(74) *Attorney, Agent, or Firm* — Mitchell M Musial, PLLC

(57) ABSTRACT

A consumable pacifier for an infant is provided herein. The invention provides a consumable gelatinous nipple where the gelatinous nipple may also contain a nutrient. The base of the gelatinous body is trapped between a seat and retainer. A variety of flavors and nutrients may be infused in the consumable gelatinous nipple.

5 Claims, 2 Drawing Sheets

CONSUMABLE PACIFIER

FIELD OF THE INVENTION

The present invention relates to a consumable pacifier for an infant. More specifically, the present invention relates to a pacifier for providing a consumable gelatinous nipple where the gelatinous nipple contains a nutrient.

BACKGROUND OF THE INVENTION

A popular treat for adults and children alike is the gummy bear. The traditional gummy bear is made from a mixture of sugar (sucrose $C_{12}H_{22}O_{11}$), glucose syrup, starch (starch is a polymer of glucose, $C_6H_{12}O_6$), flavoring, food coloring, citric acid ($C_6H_8O_7$), and gelatin. Gelatin is an incomplete protein.

Food products containing gelatin are prepared by mixing a gelatin-containing mix with boiling water, then adding additional ingredients and cooling the resultant mixture to solidify the product.

Gelatin is a protein derived from collagen, the connective tissue of animals. Gelatin is a protein with unique gelling properties. As gelatin is heated it becomes soluble, and forms a protein matrix that traps water within it. Gelatin is a widely used food ingredient and has been used to modify the texture of food product such as desserts, ice cream and frozen confections.

Gelatin is a type of hydrocolloid—a long chain of complex sugars called polysaccharides. A hydrocolloid is defined as a type of mechanical mixture where one substance is dispersed evenly throughout water. A hydrocolloid has colloid particles that spread throughout water, and depending on the quantity of water available, can behave as a gel or liquid. Many hydrocolloids can change their physical behavior and characteristics with the addition or elimination of heat. Hydrocolloids have the ability to thicken and form gels at very low concentrations.

Gummy bears ordinarily contain mostly empty calories, but recently gummy bears containing multivitamins have also been produced to provide nutrients. Additionally, gummy bears containing the cavity-fighting additives, such as xylitol, have also been produced as well as additives to help the immune system.

A number of inventions have been directed toward providing pacifiers for providing nutrients and or medicine, including U.S. Pat. No. 5,013,321 for "Gel Dispensing Pacifier" to MacVane, U.S. Pat. No. 5,078,734 for "Medication Dispensing Pacifier" to Noble and U.S. Pat. No. 5,176,705 for "Medication Dispensing Pacifier" also to Noble. In addition, there have been inventions directed toward pacifiers for providing treats to children, including U.S. Pat. No. 4,992,283 for "Frozen Confection Holder For Toddlers" to Shorey. However, nowhere in the prior art is there a pacifier for providing consumable pacifier for an infant. Furthermore, nowhere in the prior art is there a pacifier for providing a consumable gelatinous nipple where the gelatinous nipple contains a nutrient.

A number of pacifiers are formed of BPAs, PVC, parabens or phthalates that may contain harmful chemicals. An additional concern is unknown allergies, such as latex allergies.

Therefore, there is a need to provide a pacifier for providing a consumable pacifier for an infant. In addition, there is a need a pacifier for providing a consumable gelatinous nipple where the gelatinous nipple contains a nutrient.

SUMMARY OF THE INVENTION

An infant's pacifier for providing a consumable nipple, comprises a consumable gelatinous body having a base and a nipple axially spaced from the base. The base has an outer diameter extending orthogonally from an axis and is defined by a bottom surface and a top surface axially spaced from said bottom surface to form a thickness. A generally bulbous nipple extends from the top surface of the base. The nipple has a peak diameter being the widest diameter of the nipple.

A shield has a back wall and a side wall extending orthogonally from the back wall. The back wall has a diameter extending orthogonally from the axis and is defined by a back face and a land axially spaced from the back face to form a wall thickness. The land is defined by a bore diameter extending orthogonally from the axis. The side wall has a height and is defined by a bore and outer surface radially spaced from the bore to form a side wall thickness. The bore extends orthogonally from the land and has a wall height. A seat is formed from the bore and the land. The seat is adapted to receive the base of the consumable gelatinous body where the base of the consumable gelatinous body is in contact with the seat. The outer surface is at least partially threaded. The shield is of sufficient diameter to prevent said pacifier from being drawn into an infant's mouth.

A cover has a front wall and a flange extending orthogonally from the front wall. The front wall has a diameter extending orthogonally from the axis and is defined by a front face and a retainer axially spaced from the front face to form a cover thickness. The retainer is defined by a diameter extending orthogonally from the axis. The flange has a flange height and is defined by an at least partially threaded inner surface and an outer surface radially spaced from the at least partially threaded inner surface to form a flange thickness. An aperture is disposed in the cover about an axis that has a diameter larger than said peak diameter of the nipple to permit the nipple to be disposed through the aperture.

A handle extends from the back face of the shield. The at least partially threaded inner surface of the cover is adapted to threadedly engage the at least partially threaded outer surface of the shield where the base of the consumable gelatinous body is trapped between the seat and the retainer.

The pacifier further comprising an elastomeric seal having a seal aperture and outer diameter, the seal is fixedly attached to the cover aperture at the outer diameter and the seal aperture is adapted to permit the nipple to be disposed through the seal aperture. The pacifier may comprise a consumable nipple adapted to contain nutrients. Nutrients may include cavity fighting additive, vitamins, and or additives to help the immune system.

Further objects, features and advantages of the present invention will become apparent to those skilled in the art from analysis of the following written description.

DESCRIPTION OF THE PREFERRED EMBODIMENT

As used herein, the term "gelatinous" shall refer to a product that resembles a product containing gelatin, rather than a product specifically containing gelatin—a common jellying agent. The properties of the gelatinous or "gummy" nipple may be modified as appropriate or necessary.

Figure 1:
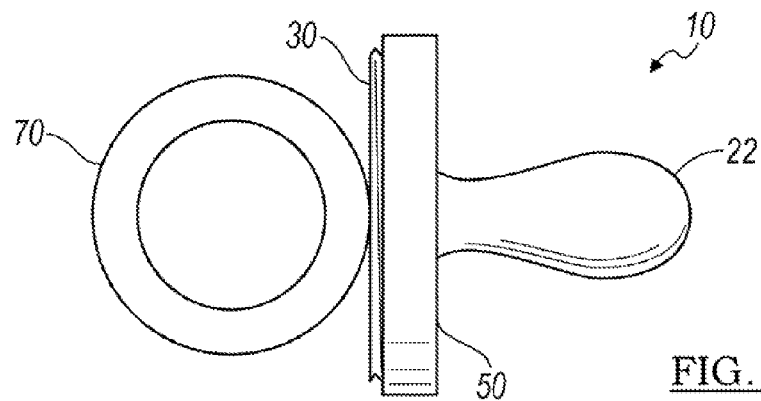
FIG. 1 is a side view of an embodiment of the pacifier according to the principles of the present invention.
Figure 2A:
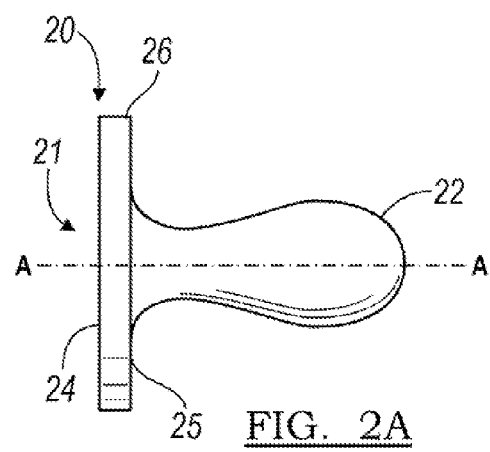
FIG. 2A is a side view of a consumable gelatinous body according to the principles of the present invention.
Figure 2B:
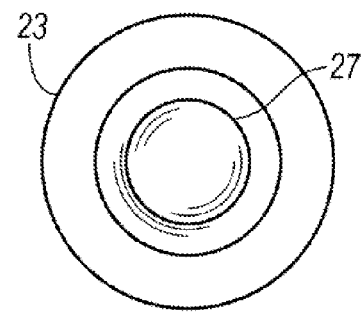
FIG. 2B is a top view a consumable gelatinous body according to the principles of the present invention.

Referring now to FIG. 1, a side view of an embodiment of the pacifier 10 according to the principles of the present invention is shown. The pacifier 10 for an infant comprises a gelatinous nipple 22, a shield 30, a cover 50 a handle 70. Referring now also to FIGS. 2A and 2B, a consumable nipple, comprises a consumable gelatinous body 20 having a base 21 and a nipple 22 axially spaced from the base 21. The base 21 has an outer diameter 23 extending orthogonally from an axis A-A and is defined by a bottom surface 24 and a top surface 25 axially spaced from said bottom surface 24 to form a thickness 26. A generally bulbous nipple 22 extends from the top surface 25 of the base 21. The nipple 22 has a peak diameter 27, being the widest diameter of the nipple 22.

Figure 3A:
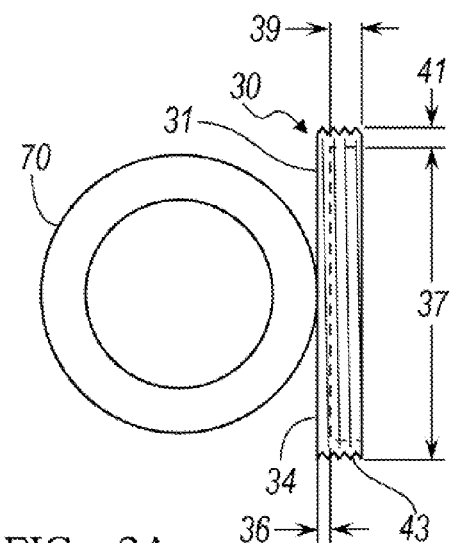
FIG. 3A is a side view of a shield according to the principles of the present invention.
Figure 3B:
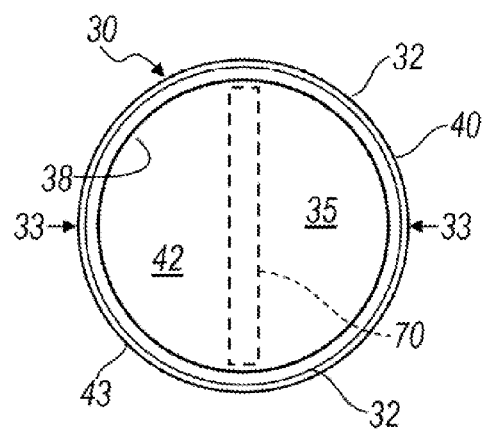
FIG. 3B is a top view of a shield according to the principles of the present invention.

Referring now also to FIGS. 3A-3C, a shield 30 according to the principles of the present invention is shown in side and top views, respectively. The shield 30 has a back wall 31 and a side wall 32 extending orthogonally from the back wall 31. The back wall 31 has a back wall diameter 33 extending orthogonally from the axis and is defined by a back face 34 and a land 35 axially spaced from the back face 34 to form a wall thickness 36.

The land 35 is defined by a bore diameter 37 extending orthogonally from the axis. The side wall 32 has a height 39 and is defined by a bore 38 and outer surface 40 radially spaced from the bore 38 to form a side wall thickness 41. The bore 38 extends orthogonally from the land 35 and has a wall height 39. A cavity 42 is formed from the bore 38 and the land 35. The cavity 42 is adapted to receive the base 21 of the consumable gelatinous body 20 where the base 21 of the consumable gelatinous body 20 is in contact with the cavity 42. The outer surface 40 is at least partially threaded by and contains threads 43. The shield 30 is of sufficient diameter 33 to prevent said pacifier 10 from being drawn into an infant's mouth.

Figure 4C:
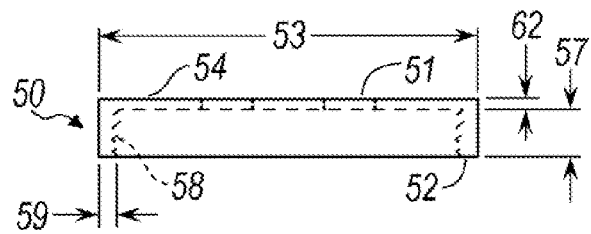
FIG. 4C is a side view of a cover according to the principles of the present invention.
Figure 4A:
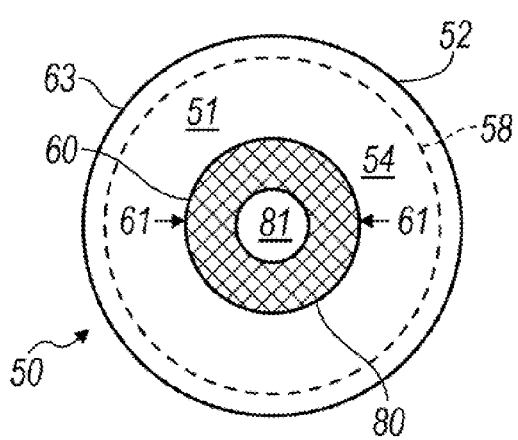
FIG. 4A is a top view of a cover according to the principles of the present invention.
Figure 4B:
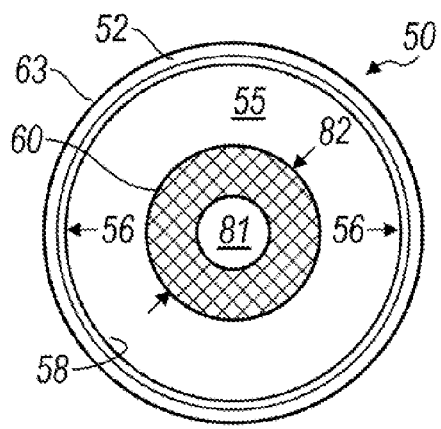
FIG. 4B is a bottom view of a cover according to the principles of the present invention.

Referring now also to FIGS. 4A-4C, a cover 50 according to the principles of the present invention is shown in top, bottom and side views, respectively. The cover 50 has a front wall 51 and a flange 52 extending orthogonally from the front wall 51. The front wall 51 has a diameter 53 extending orthogonally from the axis and is defined by a front face 54 and a retainer 55 axially spaced from the front face 54 to form a cover thickness 62. The retainer 55 is defined by a diameter 56 extending orthogonally from the axis. The flange 52 has a flange height 57 and is defined by an at least partially threaded inner surface 58 and an outer surface 63 radially spaced from the at least partially threaded inner surface 63 to form a flange thickness 59. An aperture 60 is disposed in the cover 50 about an axis where the aperture 60 has a diameter 61 larger than said peak diameter 27 of the nipple 22 to permit the nipple 22 to be disposed through the aperture 60.

A handle 70, which may be in the shape of a ring, extends from the back face 34 of the shield 30 to permit the infant to clutch the pacifier 10. The at least partially threaded inner surface 58 of the cover 50 is adapted to threadedly engage the at least partially threaded outer surface 40 of the shield 30 where the base of the consumable gelatinous body 20 is trapped between the cavity 42 and the retainer 55.

The pacifier 10 further comprising an elastomeric seal 80 comprised of suitable material having a seal aperture 81 and outer diameter 82, the seal 80 is fixedly attached to the cover aperture 60 at the outer diameter 82 of the seal 80 and the seal aperture 81 is adapted to permit the nipple 22 to be disposed through the seal aperture 81.

Figure 5:
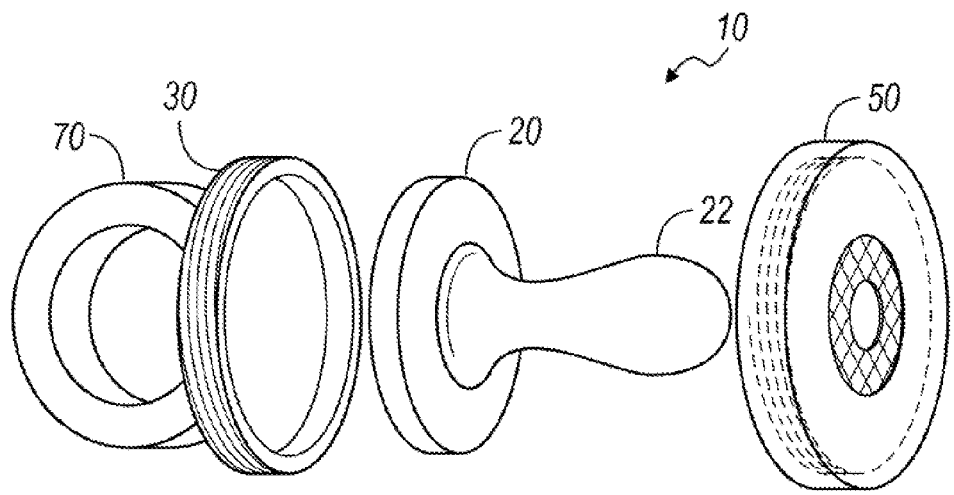
FIG. 5 is a perspective exploded view of the pacifier according to the principles of the present invention, revealing how the pacifier is assembled.

Referring now also to FIG. 5, a perspective exploded view of the pacifier 10 according to the principles of the present invention is shown, revealing how the pacifier 10 is assembled. The base 21 of the consumable gelatinous body 20 is disposed within the cavity 42 of the shield 30. The cover 50 passes over the nipple 22 where the aperture 81 of the seal. 80 is large enough and the material of the seal 80 is pliable enough to permit the peak diameter 27 of the nipple 22 to pass though the aperture 81. The threaded inner surface 58 of the cover 50 threadedly engages the threads 43 of the outer surface 40 of the shield 30. As the cover 50 threadedly engages the shield 30, the base 21 of the consumable gelatinous body 20 is compressed between the land 35 of the shield 30 and the retainer 55 of the cover 50, securing the base 21 of the consumable gelatinous body 20 within the cavity. After the nipple 22 of the consumable gelatinous body 20 is exhausted, the body 20 may be replaced with another body 20 of the same or a different flavor, color or a body 20 having nutrients as may be appropriate by simply unscrewing the cover 50 from the shield 30.

The pacifier 10 may comprise a consumable nipple 22 adapted or infused to contain nutrients. Nutrients may be selected from the group consisting of a cavity fighting additive, one of more vitamins, a multivitamin or additives to help the immune system.

The shield 30 and cover 50 may be comprised of any suitable material known in the art, although any plastics not containing BPAs, PVC, parabens or phthalates are preferred. It is also contemplated that safe, recycled materials may be employed in the shield 30 and cover 50 of the present invention.

The present invention permits the infant to enjoy a safe pacifier 10 with a pleasant flavor that may also contain nutrients in the consumable nipple 22.

The foregoing discussion discloses and describes the preferred structure and control system for the present invention. However, one skilled in the art will readily recognize from such discussion, that various changes, modifications and variations can be made therein without departing from the true spirit and fair scope of the invention.

The invention claimed is:

1. An infant's pacifier for providing a consumable nipple, said pacifier comprising:
   a consumable gelatinous body having a base and a nipple axially spaced from said base, said base having an outer diameter extending orthogonally from an axis and defined by a bottom surface and top surface axially spaced from said bottom surface to form a thickness and a generally bulbous nipple extending from said top surface of said base, said nipple having a peak diameter being the widest diameter of the nipple;
   a shield having a back wall and a side wall extending orthogonally from said back wall, said back wall having a diameter extending orthogonally from the axis and defined by a back face and a land axially spaced from said back face to form a wall thickness, said land defined by a bore diameter extending orthogonally from the axis, said side wall having a height and defined by a bore and an at least partially threaded outer surface radially spaced from said bore to form a side wall thickness, said bore extending orthogonally from said land and having said wall height, a cavity formed from said bore and said land, said cavity receives a base of said consumable gelatinous body;

a handle extending from said back face of said shield;

a cover having a front wall and a flange extending orthogonally from said front wall, said front wall having a diameter extending orthogonally from the axis and defined by a front face and a retainer axially spaced from said front face to form a cover thickness, said retainer defined by a diameter extending orthogonally from the axis, said flange having a flange height and defined by an at least partially threaded inner surface and an outer surface radially spaced from said at least partially threaded inner surface to form a flange thickness, an aperture disposed within said cover about the axis, said cover aperture having a diameter larger than said peak diameter of said nipple, said at least partially threaded inner surface of said cover threadedly engages said at least partially threaded outer surface of said shield to secure said base of said consumable gelatinous body between said land of said shield and said retainer of said cover within said cavity while permitting said nipple to be disposed through said cover aperture.

2. The pacifier of claim 1, further comprising an elastomeric seal having a seal aperture and outer diameter, said seal fixedly attached to said cover aperture at said outer diameter and said seal aperture permits said nipple to be disposed through said seal aperture.

3. The pacifier of claim 1, wherein the pacifier comprises a consumable nipple containing nutrients.

4. The pacifier of claim 1, wherein the pacifier comprises a nipple containing a cavity fighting additive.

5. The pacifier of claim 1, wherein the pacifier comprises a consumable nipple containing vitamins.

* * * * *